(12) United States Patent
Sander et al.

(10) Patent No.: US 12,052,949 B2
(45) Date of Patent: Aug. 6, 2024

(54) AGRICULTURAL HARVESTING MACHINE, AND METHOD FOR OPERATING AN AGRICULTURAL HARVESTING MACHINE

(71) Applicant: CLAAS Selbstfahrende Erntemaschinen GmbH, Harsewinkel (DE)

(72) Inventors: Stefan Sander, Versmold (DE); Mathias Escher, Wallenhorst (DE); Carsten Grove, Beelen (DE); Alexander Kirchbeck, Drensteinfurt (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1189 days.

(21) Appl. No.: 16/811,067

(22) Filed: Mar. 6, 2020

(65) Prior Publication Data
US 2020/0281119 A1    Sep. 10, 2020

(30) Foreign Application Priority Data
Mar. 8, 2019    (DE) .......................... 102019105982.8

(51) Int. Cl.
*A01D 41/127*    (2006.01)
*A01D 43/08*    (2006.01)

(52) U.S. Cl.
CPC ....... *A01D 41/1277* (2013.01); *A01D 43/085* (2013.01)

(58) Field of Classification Search
CPC .............. A01D 41/127; A01D 41/1272; A01D 41/1277; A01D 43/085; A01D 43/087
See application file for complete search history.

(56) References Cited

U.S. PATENT DOCUMENTS

| 6,931,828 | B2 * | 8/2005 | Kormann | ................ | A01F 29/22 |
| | | | | | 56/250 |
| 7,804,588 | B2 * | 9/2010 | Kormann | ........... | A01D 41/1277 |
| | | | | | 356/634 |

(Continued)

FOREIGN PATENT DOCUMENTS

| CA | 2355517 A1 * | 2/2003 | ........... A01D 43/086 |
| DE | 102018213215 A1 * | 2/2020 | |

(Continued)

OTHER PUBLICATIONS

European Search Report for European Patent Application No. 19213868.3-1004 dated Jun. 15, 2020.

*Primary Examiner* — Alicia Torres
(74) *Attorney, Agent, or Firm* — Lempia Summerfield Katz LLC (57) ABSTRACT

An agricultural harvesting machine and a method for operating an agricultural harvesting machine. The agricultural harvesting machine includes an attachment configured to receive a crop containing grain components, at least one work assembly for processing the received crop, a transfer device, a near-infrared (NIR), and an evaluation device. The crop is received by the attachment and traverses the harvesting machine, thereby defining a crop stream. The NIR sensor is positioned along the crop stream downstream from the at least one work assembly and generates one or more signals indicative of at least one aspect of the grain components in the crop stream. Further, the evaluation device receives and analyzes the signals from the NIR sensor in order to determine a degree to which the grain components contained in the crop stream are cracked.

17 Claims, 2 Drawing Sheets

(56) References Cited

U.S. PATENT DOCUMENTS

| | | | | |
|---|---|---|---|---|
| 8,554,424 | B2* | 10/2013 | Kormann | A01D 43/085 |
| | | | | 56/11.1 |
| 11,009,395 | B2* | 5/2021 | Schade | G01J 3/0232 |
| 11,564,349 | B2* | 1/2023 | Bonefas | A01D 82/00 |
| 2008/0186487 | A1* | 8/2008 | Kormann | A01D 41/1277 |
| | | | | 356/328 |
| 2016/0029561 | A1* | 2/2016 | Fischer | A01D 43/085 |
| | | | | 460/25 |
| 2017/0045444 | A1 | 2/2017 | Haiges | |
| 2017/0115211 | A1 | 4/2017 | Morimoto | |
| 2017/0138864 | A1 | 5/2017 | Lopez | |
| 2019/0056265 | A1 | 2/2019 | Schade | |
| 2020/0041340 | A1 | 2/2020 | Schade | |
| 2022/0022375 | A1* | 1/2022 | Murray | A01D 41/127 |
| 2023/0135705 | A1* | 5/2023 | Wendte | G06T 7/0004 |
| | | | | 382/104 |

FOREIGN PATENT DOCUMENTS

| | | | | |
|---|---|---|---|---|
| DE | 102021113838 | A1 * | 12/2022 | |
| EP | 1166619 | A1 * | 1/2002 | A01D 43/086 |
| EP | 1894461 | A1 | 3/2008 | |
| EP | 2232978 | A1 | 9/2010 | |
| EP | 1407654 | B1 | 7/2012 | |
| EP | 3130213 | A1 | 2/2017 | |
| EP | 3444577 | A1 | 2/2019 | |
| WO | 2016001572 | A1 | 1/2016 | |

* cited by examiner

Fig. 1

AGRICULTURAL HARVESTING MACHINE, AND METHOD FOR OPERATING AN AGRICULTURAL HARVESTING MACHINE

CROSS REFERENCE TO RELATED APPLICATION

This application claims priority under 35 U.S.C. § 119 to German Patent Application No. DE 102019105982.8 (filed Mar. 8, 2019), the entire disclosure of which is hereby incorporated by reference herein.

TECHNICAL FIELD

The present invention relates to an agricultural harvesting machine and a method for operating an agricultural harvesting machine.

BACKGROUND

EP 1 407 654 B1 discloses a harvesting machine that includes a sensor device for detecting contents of an agricultural crop. The sensor device has a sensor that operates based on near-infrared (NIR) spectroscopy (e.g., an example of a NIR sensor) past which a flow of a crop is guided. Organic and inorganic contents of the crop are detected and quantified using the NIR sensor. The harvesting machine includes an evaluation apparatus that evaluates the signals provided by the NIR sensor.

EP 2 232 978 A1 discloses a forage harvester with a secondary crushing device in which a crop stream is guided through the secondary crushing device in order to break up grain components contained in the crop stream. The crop stream is monitored by a camera. Using the images generated by the camera, a control unit detects the whole grains and the broken-up grain components in the crop stream. The secondary crushing device is adjusted depending on the ratio of whole grains to the broken-up grain components.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Various aspects of the crop may be determined. As one example, the contents of the crop received by the harvesting machine may be determined. Alternatively, or in addition, the physical state of the grain components contained in the crop may be determined, whereby the physical state of the grain component may then be used to determine whether and/or how to process the grain components (e.g., further treatment(s)) after the grain component has been harvested by the harvesting machine.

For example, the crop may be subjected to ensiling in order to produce feed. To this end, the crop, which may comprise crushed corn plants, may be placed in a silo and compressed therein in order to press out air and prevent aerobic decomposition from fungi and bacteria. Then, the compressed material may be stored covered, which initiates a fermentation process that converts the material into so-called silage. For the silage to be digestible by animals (e.g., by ruminants), the grain components should be broken up. Breaking up the grain may be accomplished, for example, when harvesting corn with a harvesting machine (which may comprise a forage harvester), such as using a secondary crushing device (which may be used in combination with the harvester), with the secondary crushing device being designed as a forage harvester head.

In one or some embodiments, the harvesting machine is configured to determine at least one aspect (e.g., a degree of cracking, such as a percentage of cracking) of the grain components, and may, in turn, modify operation (e.g., modify operation of the secondary crushing device) responsive to the determined at least one aspect (e.g., responsive to the degree to which the grain components in the crop stream are cracked). As discussed in more detail below, detection of the at least one aspect (e.g., the degree of cracking) of the grain components may be performed with less effort.

In one or some embodiments, a harvesting machine is disclosed that comprises an attachment configured to receive a crop containing one or more grain components, at least one work assembly for processing the received crop, and a transfer device. The crop received by the attachment may traverse or run through the harvesting machine as a crop stream, wherein a near-infrared sensor (a "NIR sensor") is positioned relative to the crop stream (e.g., the NIR sensor senses along the crop stream downstream from the at least one work assembly, such as positioned relative to any one, any combination, or all of a feed device, a chopping device, or a secondary crushing device) in order to detect or sense at least one aspect (e.g., cracking, such as a degree of cracking) of the crop stream. An evaluation device is configured to receive and analyze the signals from the NIR sensor, wherein the evaluation device's analysis of the signals is directed to determining a degree to which the grain components contained in the crop stream are cracked. Various types of degrees of cracking are contemplated. As one example, the degree of cracking may comprise an amount that a grain component has been cracked (with different degrees of cracking being illustrated in FIG. 2, discussed further below). In this regard, any discussion regarding the degree of cracking may encompass various types of degrees of cracking. According to one or some embodiments, an NIR sensor that is already in the harvesting machine and is already used to detect contents in the crop stream may be used in order to also determine the degree to which the grain components contained in the crop stream are cracked. In this regard, using a camera, as is known from the prior art to determine the degree of cracking, may thus be discarded along with a device for image processing and image evaluation that is needed for this (e.g., an image processing/evaluation device needed to process the images generated by the camera in order to determine cracking). In particular, the use of the NIR sensor and the analysis on the part of the evaluation device of the signals provided by the NIR sensor enable real-time processing for determining the degree of cracking of the grain components in the crop stream under the currently predominating operating conditions of the harvesting machine. The degree of cracking to be determined describes the physical state of a grain component after it is processed by the at least one work assembly. That is, the structure of the grain component may be determined independent of the size of the grain component. A grain component comprising a whole grain that is only crushed or only broken open but is not divided into at least two parts may be difficult to digest by a ruminant for example when used later as feed, independent of whether it is a large or small grain.

In one or some embodiments, the work assembly may be configured or its operation modified based on the detecting cracking. In particular, at least one operating parameter of the at least one work assembly may be set depending on the determined degree of cracking of the grain components. In this manner, an operating parameter influencing the degree of cracking of the grain components may be adapted, such as continuously (e.g., continuously for a certain time period of operation), in order to react or respond to changing harvesting conditions. Changing harvesting conditions may, for example, be different varieties within one crop species and/or different fields to be harvested. Moreover, the moisture of the crop may be a harvesting condition. By adapting the at least one operating parameter responsive to the harvesting condition(s) (such as dynamically based on changing harvesting condition(s)), a substantially uniform work result can be achieved under the changing harvesting conditions.

To accomplish this, the at least one operating parameter may be set automatically, or after a confirmation by an operator of the harvesting machine. The at least one operating parameter may be automatically adjusted in this case by the evaluation device, or by another control unit. Thus, any disclosure herein regarding an evaluation device may include an evaluation device that both evaluates and adjusts the at least one operating parameter or an evaluation device that evaluates and causes the adjustment (such as via another control unit) of the at least one operating parameter. In the case of confirmation by an operator of the harvesting machine, the harvesting machine, such as prompted by the evaluation device, may generate an output in order to solicit an operator of the harvesting machine to confirm implementation of the output. For example, the harvesting machine may initially propose (such as via a display) a new value to the operator for the at least one operating parameter that is only implemented upon confirmation by the operator.

In particular, the evaluation device may comprise at least one memory device in which a database may save reference values for different degrees of cracking (e.g., correlating different reference values with different degrees of cracking). This enables a direct comparison of the evaluated signals provided by the NIR sensor with the reference values in order to determine the degree of cracking of the grain components detected by the NIR sensor (e.g., the evaluation device determines the degree to which the grain components in the crop stream are cracked by comparing the one or more signals generated by the NIR sensor with the reference values in the database). In particular, a plurality of reference values for different degrees of cracking may be saved taking into account the variety and/or moisture content of the crop. In this case, it is advantageous that the moisture content may be identified contemporaneously (e.g., simultaneously) in addition to the degree of cracking by just one NIR sensor arranged in the harvesting machine.

In one or some embodiments, the degree of cracking of the grain components contained in the crop stream may be determined by the evaluation device using a comparison of color spectra (e.g., the evaluation device determines the degree by the color spectra generated by the NIR sensor with the reference color spectra values that may be stored in a database). The color spectra detected by the NIR sensor may vary depending on the degree of cracking of the grain components.

Moreover depending on at least one operating parameter of the at least one work assembly, a categorization of default cracking degrees can be provided that the evaluation device uses to analyze the color spectra detected by the NIR sensor in order to determine the degree of cracking. To accomplish this, in one or some embodiments, the detected color spectra of a plurality of grain components may be compared with each other. In a specific implementation, a statistical evaluation of the color spectra detected in real time may be used in order to perform a categorization of the degree of cracking using the default cracking degrees.

In one or some embodiments, the harvesting machine may be designed as a field harvester or combine. In particular, when plants to be ensilaged are harvested by a field harvester, particular importance may be ascribed to cracking the grain components to ensure easy digestibility by ruminants. In a combine, the analysis of the signals that are for determining a degree of cracking of the grain components contained in the crop stream may serve to determine broken grain.

In one or some embodiments, the at least one work assembly may be a secondary crushing device. The secondary crushing device of a field harvester serves to crack grain components (e.g., to divide the grain components into at least two parts by mechanical processing). The achievable degree of cracking may be determined by at least one adjustable operating parameter of the secondary crushing device.

In this case, various operating parameters are contemplated. As merely examples, a spacing of rollers and/or a differential rotational speed of the rollers of the secondary crushing device may be set as the operating parameter(s). In particular, as the spacing of the rollers of the secondary crushing device decreases, the degree of cracking of the grain components increases. At the same time, the power consumption of the secondary crushing device, and therefore the consumption of fuel by the harvesting machine, increases significantly. By determining the degree of cracking of the grain components using the NIR sensor, the spacing of the rollers may be adapted or modified to the existing harvesting conditions. Accordingly, the rollers of the secondary crushing device need only be operated with the spacing required for the necessary degree of cracking (and thus may be modified in order to reduce energy consumption while still performing the necessary degree of cracking). In addition or alternatively, the differential rotational speed of the rollers may be adapted depending on the determined degree of cracking in order to achieve or maintain the necessary or desired degree of cracking. Associated with this, the operation of the secondary crushing device may also be optimized corresponding to the existing harvesting conditions.

In particular, wear arising in the secondary crushing device can be detected by determining the degree of cracking. If the rollers do not result in the required degree of cracking from adaptations to the spacing of the rollers and/or to the differential rotational speed performed depending on the determined degree of cracking, this may be considered an indicator of the wear of the rollers of the secondary crushing device.

Moreover, a method is disclosed for operating an agricultural harvesting machine. Specifically, the method comprises using an attachment for receiving a crop containing grain components, at least one work assembly for processing the received crop as well as a transfer device, wherein the crop received by the attachment runs through the harvesting machine as a crop stream, wherein an NIR sensor is arranged or positioned along the crop stream, such as downstream from the at least one work assembly and detects the crop stream, and an evaluation device receives and analyzes the signals from the NIR sensor, wherein a degree to which the grain components contained in the crop stream are cracked is determined by the analysis of the signals provided by the NIR sensor. This may yield monitoring (such as continuous monitoring) of the degree of cracking in order to yield a substantially constant work result by the harvesting machine.

In so doing, color spectra of the grain components may be compared with each other to determine the degree of cracking. Depending on the degree of cracking of the grain components, the color spectra, detected by the NIR sensor, may vary. A grouping may be performed through a statistical evaluation of the frequency of different color spectra in the crop stream.

In particular, the evaluation device may determine correlations of the signals provided by the NIR sensor and compare them with correlation values for different degrees of cracking saved in a memory device. A mathematical relationship between these two parameters may be established using the spectral information from the NIR sensor and the known correlation values saved in the memory device for different degrees of cracking. Using the correlations of the detected color spectra with the correlation values in the evaluation device, a categorization may be performed in order to determine the particular degree of cracking. The categorization may enable or allow for the assignment of degrees of cracking to different adjustable spacing values and/or differential rotational speed values with which, for example, rollers of a secondary crushing device of a field harvester may be operated.

In one or some embodiments, at least one operating parameter of the at least one work assembly may be adapted or modified depending on the determined degree of cracking of the grain components. This allows for consistency in processing, such as a constant work result to be achieved (e.g., consistent degree of cracking). In so doing, changes in the harvesting conditions may be taken into account, such as automatically accounted for.

Referring to the figures, the disclosed agricultural harvesting machine and the disclosed method for operating the harvesting machine enable control of one or more aspects of the harvesting machine, such as in setting the parameters of one, some or all of work assemblies (example work assemblies may comprise any one, any combination, or all of attachment 2, feed device 3, chopping device 4, or secondary crushing device 5 that are part of the harvesting machine 1, thereby supporting and/or performing agricultural work (e.g., the harvesting process). Thus, any discussion herein regarding a work assembly may comprise any one, any combination, or all of the work assemblies discussed herein.

Figure 1:
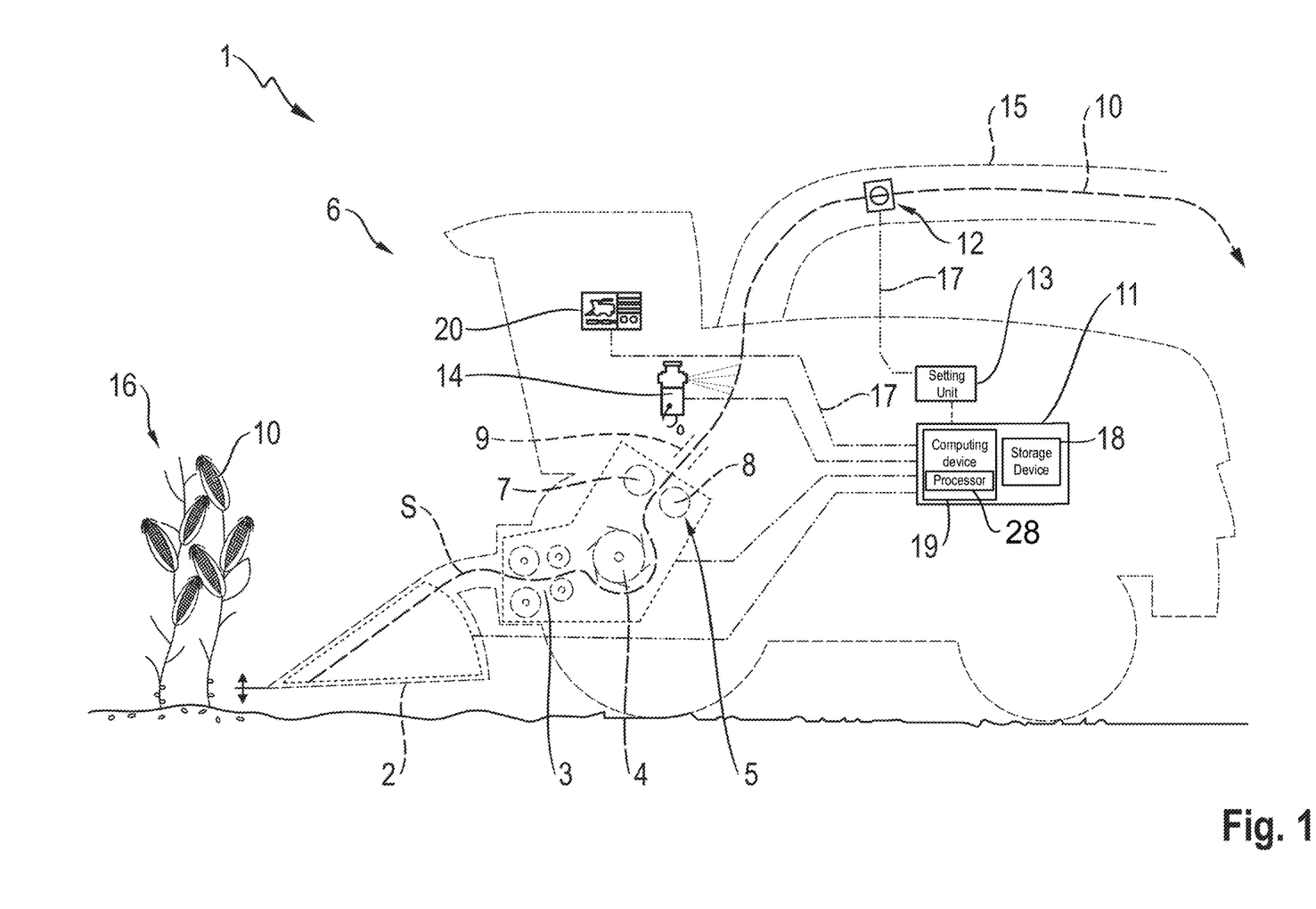
FIG. 1 schematically shows a side view of a harvesting machine.

FIG. 1 schematically shows a side view of an agricultural harvesting machine 1. In the portrayed exemplary embodiment, the harvesting machine 1 is designed as a self-propelled field harvester 6. The harvesting machine 1 may also be designed as a self-propelled combine.

The harvesting machine 1 comprises an attachment 2 that is configured to receive a crop 10 by harvesting produce 16. The crop 10 passes as a crop stream S from the attachment into a feed device 3 having a plurality of driven rollers which is followed (in the crop stream direction) by a chopping device 4. The chopping device 4 comprises a rotating cutter drum for comminuting or chopping up the crop 10. The crop stream S may comprise the comminuted crop 10 produced by harvesting the produce 16, which flows through the delivery channel 9 and may then be received and removed by a transport vehicle.

An optional secondary crushing device 5 is downstream from the chopping device 4. The secondary crushing device 5 may also be termed a corn cracker or crop cracker and serves to crack grain components in the crop stream. If it is unnecessary to operate the secondary crushing device 5 during a harvesting process, for example when harvesting grass, the secondary crushing device 5 may be swung out of the crop stream S or be removed entirely. The secondary crushing device 5 has two driven rollers 7, 8 that are driven at different rotational speeds. In so doing, the rotational speed differential between the rollers 7, 8 may be changed. Using the secondary crushing device 5, the grain components contained in the crop stream S are cracked when processing corn, and stem segments are frayed, and stalk discs are broken up.

The attachment 2, the feed device 3, the chopping device 4, as well as the secondary crushing device 5 are work assemblies of the harvesting machine 1 that serve to process the received crop. Other work assemblies instead of, or in addition to, those disclosed are contemplated.

Subsequently, the crop stream S is guided by a silage additive system 14 in a delivery channel 9 through which silage additive may be fed to the crop stream S. Then, the crop stream S passes by an NIR sensor 12, which is a sensor that works based on near infrared spectroscopy, that is arranged or positioned here in a transfer device 15, for example. As discussed above, NIR sensor 12 may comprise a near-infrared spectroscopy sensor that uses the near-infrared region of the electromagnetic spectrum (e.g., in one or more ranges from 780 nm to 2500 nm). In principle, the NIR sensor 12 may also be arranged or positioned at different location(s) along the crop stream S on or in the delivery channel 9. In this case, the NIR sensor 12 may be arranged downstream from the work assembly (e.g., attachment 2, feed device 3, chopping device 4, or secondary crushing device 5), whose operating parameters are to be adapted or modified.

In one or some embodiments, the NIR sensor 12 detects the different color spectra of the grain components contained in the crop stream S that result depending on the different degrees of cracking of the grain components after they are processed by the secondary crushing device 5. The signals of the NIR sensor 12 are received and evaluated by an evaluation device 11. To accomplish this, the evaluation device 11 is connected by means of a bus system 17 or by wirelessly operating communication means to the NIR sensor 12. In this regard, the evaluation device 11 may be configured to communicate with the NIR sensor 12 via wired or wireless communication.

The evaluation device 11 comprises at least one memory device, such as a memory device 18, and a computing device 19. Computing device 19 may be configured to perform computing functionality and may comprise a processor 28 (which may comprise a microprocessor, controller, PLA or the like). Though FIG. 1 illustrates only one memory device (memory device 18), in one implementation, computing device 19 may comprise a separate memory device. Alternatively, computing device 19 may rely on memory device 18 for its computing needs. Further, memory device 18 and computing device 19, depicted as separate elements, may be part of a single machine or may be separate machines. In this regard, memory device 18 and computing device 19 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions, which may comprise computer-readable instructions, may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described herein or illustrated in the drawings.

The evaluation device 11 may communicate with input and output device 20, such as via the bus system 17 to which input and output device 20 is connected. In one or some embodiments, input and output device 20 is positioned in a cabin of the harvesting machine 1. The input and output device 20 is configured to generate outputs, such as visual outputs, and/or receive inputs. In this regard, input and output device 20 enables outputting a visual representation of operating parameters of the harvesting machine 1, as well as their work assemblies (e.g., any one, any combination, or all of attachment 2, feed device 3, chopping device 4, or secondary crushing device 5). Moreover, the input and output device 20 allows an operator of the harvesting machine 1 to make, modify or adapt settings to the operating parameters of one, some, or all of the work assemblies (e.g., any one, any combination, or all of attachment 2, feed device 3, chopping device 4, or secondary crushing device 5). The controlling of the work assemblies (e.g., any one, any combination, or all of attachment 2, feed device 3, chopping device 4, or secondary crushing device 5) may be executed using setting unit 13. To accomplish this, the setting unit 13 may receive control data (e.g., a control command) from the evaluation device 11 in order to control one or more of the work assemblies (e.g., any one, any combination, or all of attachment 2, feed device 3, chopping device 4, or secondary crushing device 5) on the basis of this control data, or to execute at least one operating parameter setting of the respective work assembly (e.g., attachment 2, feed device 3, chopping device 4, or secondary crushing device 5). In this regard, responsive to determining the degree of cracking, the evaluation device 11 may send a command (e.g., automatically or responsive to confirmation by the operator) to control one or more of the work assemblies (such as via setting unit 13) in order for the one or more work assemblies to set at least one operating parameter. For example, the evaluation device 11 may send a command to the secondary crushing device 5, with the command to set one or more operating parameters (such as one or both of spacing of the plurality of rollers or a differential rotational speed of the plurality of the rollers) in the secondary crushing device 5, as discussed further below.

Figure 2:
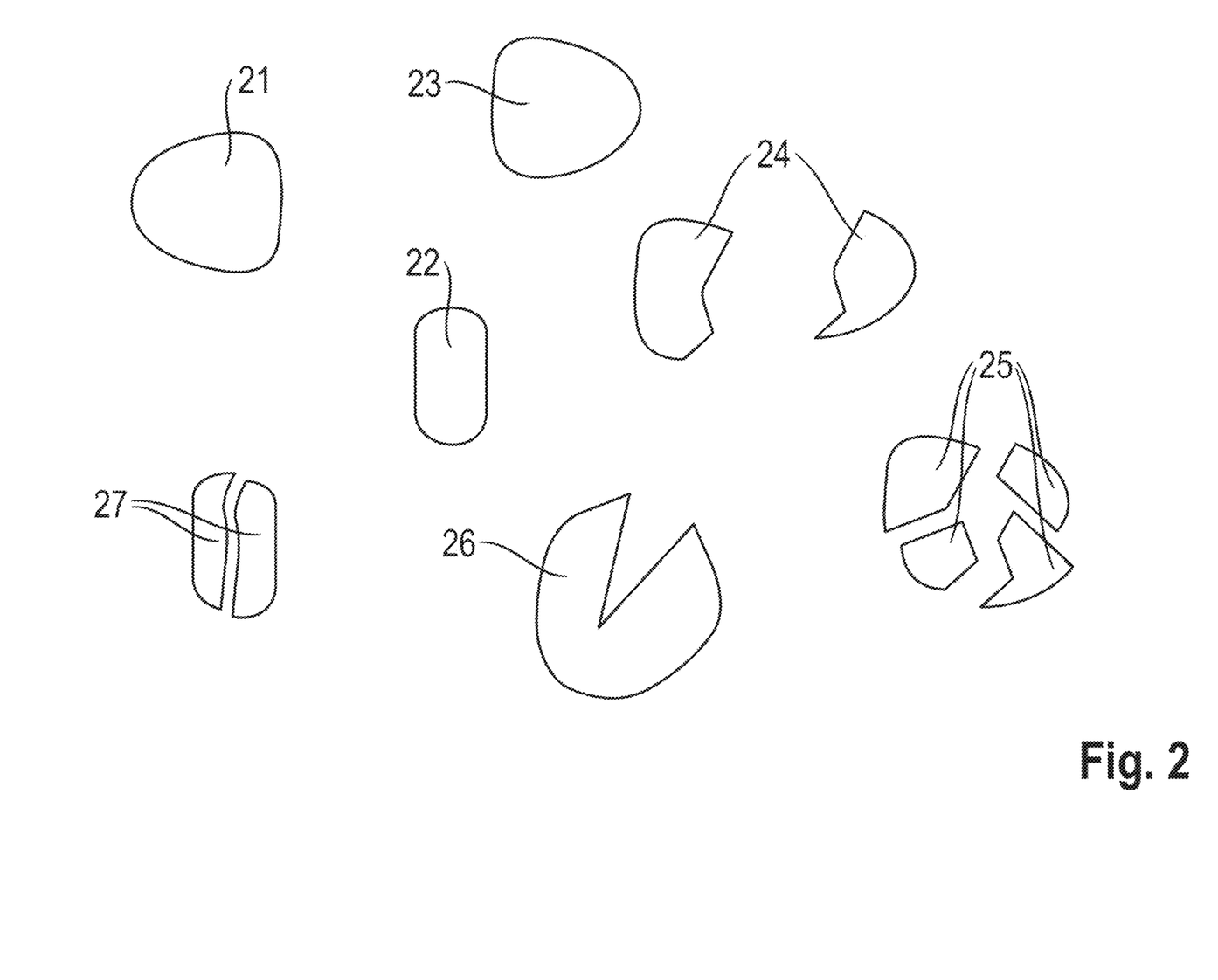
FIG. 2 shows an example of schematically portrayed grain components before processing, and grain components after processing by a secondary crushing device of the harvesting machine.

FIG. 2 shows a schematic example of grain components 21, 22 before being processed, as well as grain components 23, 24, 25, 26, 27 after being processed by the secondary crushing device 5. The grain components 21, 22 present as a whole grain should be cracked for use as feed for ruminants for the sake of improved digestibility (e.g., the grain components 21, 22, are to be broken up at least once). To accomplish this, the whole grains 21, 22 may be fed to the secondary processing device, such as secondary crushing device 5.

Depending on the set operating parameter(s) of the secondary processing device, such as secondary crushing device 5, the grain components 21, 22 to be processed as whole grains may have different degrees of cracking upon leaving or exiting the secondary processing device, such as secondary crushing device 5. FIG. 2 shows a few grain components after being processed using different operating parameters for the secondary crushing device 5 as an example. Accordingly, grain component 23 is not cracked despite being processed by the secondary crushing device 5 (e.g., grain component 23 corresponds to the grain component 21 before being processed). Grain component 24 and 27 was cracked into at least two separate, discontiguous parts. One grain component 25 was cracked into several separate parts. Contrastingly, one grain component 26 was only struck during processing so that it was only partially split open. In this regard, FIG. 2 illustrates different degrees of cracking, such as whether cracking occurs at all, whether cracking partially occurs (see grain component 26), whether cracking results in two separate discontiguous parts (see grain component 24 and 27), whether cracking results in more than two separate discontiguous parts (see grain component 25), etc.

The NIR sensor 12 may sense data indicative of these different degrees of cracking, shown as examples of the particular grain components 23 to 27 that may occur after being processed by the secondary processing device, such as secondary crushing device 5. The NIR sensor 12 may be configured to detect the different degrees of cracking in one or more ways. As one example, the NIR sensor 12 may detect the different color spectra of the processed grain components 23 to 27 that result from the different degrees of cracking. For evaluation, information may be saved in the memory device 18 of the evaluation device 11 with regard to the existing relationship between the different degrees of cracking of the grain components 23 to 27 and the color spectra that corresponds to each of them. The degree of cracking of these grain components 23 to 27 may be deduced by comparing the color spectra detected by the NIR sensor 12 of the processed grain components 23 to 27 flowing by in the crop stream S with the color spectra saved in the memory device 18 as reference values. Corresponding to the quality of the degree of cracking determined by the evaluation device 11, the quality of the setting of the operating parameter(s) of the secondary crushing device 5 may likewise be deduced.

In one or some embodiments, a categorization is provided that is oriented around an operating parameter of the secondary crushing device 5. In particular, different settings of the secondary crushing device 5 may correspond to different degrees of cracking. In this regard, the different settings may be correlated to the different degrees of cracking. For example, a categorization may be undertaken using the operating parameter of the roller spacing of the rollers 7, 8. The roller spacing of the rollers 7, 8 of the secondary crushing device 5 may significantly influence the degree of cracking and the energy consumption of the harvesting machine 1. In particular, the smaller the spacing between the rollers 7, 8, the greater the degree of cracking of the grain components and the greater the energy demand needed for driving the rollers 7, 8 (e.g., a first spacing between rollers 7, 8 is categorized to be a first degree of cracking and a second spacing between rollers 7, 8 is categorized to be a second degree of cracking). An adjustable roller spacing may form one category of an operating parameter that may be adjusted in order to modify responsive to determining a degree of cracking. For example, responsive to determining, based on data generated by the NIR sensor 12, that the degree of cracking is lower than desired, the spacing between the rollers 7, 8 may be decreased. Conversely, responsive to determining, based on data generated by the NIR sensor 12, that the degree of cracking is greater than desired, the spacing between the rollers 7, 8 may be increased.

A color spectrum for a degree of cracking with the roller spacing may be assigned to the respective category. For this, default degrees of cracking may be saved in a database in the memory device 18. By a comparative analysis of the signals provided by the NIR sensor 12 on the color spectrum, the evaluation device 11 may determine, in real time, the particular degree of cracking.

For example, the evaluation device 11 may evaluate the signals provided by the NIR sensor 12 statistically over a specific period in order to determine a categorization using the occurring frequency of specific, detected color spectra. The categorization determined by the evaluation device 11 may then serve to determine the quality of the at least one set operating parameter of the secondary crushing device 5 (e.g., a first specific setting of the spacing of rollers 7, 8 has a corresponding first degree of cracking and a second specific setting of the spacing of rollers 7, 8 has a corresponding second degree of cracking). In one or some embodiments, the evaluation device 11 may automatically transmit a control signal via the bus system 17 to the setting unit 13. In turn, the setting unit 13, using the control signal, may adapt or modify the at least one operating parameter (e.g., modify the spacing of rollers 7, 8). It is however also contemplated for the evaluation device 11 to perform the adaptation or modification of the at least one operating parameter directly (e.g., without using an intervening device such as setting unit 13). Moreover, the categorization, as determined by the evaluation device 11, may be transmitted to the input and output device 20 for output. In this way, the operator of the harvesting machine 1 may be notified.

Subsequently, the operator may independently decide whether an adaptation or modification of the at least one operating parameter is warranted in order to achieve the desired degree of cracking.

The determination of the degree of cracking makes it possible to set one or more operating parameters of the secondary crushing device 5 depending thereupon in order to optimally operate the subsequent secondary crushing device 5. By adapting or modifying the setting of the roller spacing, an improved or an optimum degree of cracking may be achieved, which may also save fuel since the secondary crushing device 5 is not operated with an excessively small roller spacing. Moreover, the differential rotational speed of the rollers 7, 8 may also be set when the detected degree of cracking does not manifest the desired influence on the work results despite an adapted setting of the roller spacing.

In addition, the analysis of the signals of the NIR sensor 12 with the aim of determining a degree of cracking of the processed grain components 23 to 27 contained in the crop stream S may be used to determine whether the secondary crushing device 5 is operating properly and/or malfunctioning (e.g., whether the teeth of the rollers 7, 8 of the secondary crushing device 5 are worn). As discussed above, previous analysis may correlate the degree of cracking to different settings of the rollers 7, 8. Thus, responsive to determining that the distance of the rollers 7, 8 is not producing the expected degree of cracking (e.g., based on the previous analysis, a predetermined distance of the rollers 7, 8 is expected to generate a certain degree of cracking but the data from NIR sensor 12 indicates otherwise), it may be determined that the rollers 7, 8 may be worn. In this regard, the evaluation device 11 may: determine, based on the analysis of the one or more signals of the NIR sensor, a current degree of cracking of the grain components; access the correlation between an operating parameter of the one or more work assemblies (such as the spacing between rollers 7, 8) and expected cracking degrees (e.g., the expected degree of cracking based on previous analysis of rollers 7, 8); access a current operating parameter of the one or more work assemblies (such as the current spacing between rollers 7,8); and detect, based the current degree of cracking, the current operating parameter, and the correlation, wear in the secondary crushing device 5 (e.g., if the current degree of cracking is less (such as less by at least a predetermined amount) than the expected degree of cracking, the secondary crushing device 5 may be subject to wear; if the current degree of cracking is within a certain margin of the expected degree of cracking, the secondary crushing device 5 may not be subject to wear).

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

LIST OF REFERENCE NUMBERS

1 Harvesting machine
2 Attachment
3 Feed device
4 Chopping device
5 Secondary crushing device
6 Forage harvester
7 Roller 8 Roller
9 Conveying channel
10 Crop
11 Evaluation device
12 NIR sensor
13 Setting unit
14 Silage additive system
15 Transfer device
16 Produce
17 Bus system
18 Storage device
19 Computing device
20 Input and output device
21 Unprocessed grain component
22 Unprocessed grain component
23 Processed grain component
24 Processed grain component
25 Processed grain component
26 Processed grain component
27 Processed grain component
28 Processor
S Crop Stream

The invention claimed is:

1. An agricultural harvesting machine comprising:
an attachment configured to receive a crop comprising grain components, the crop traversing through the agricultural harvesting machine comprising a crop stream;
one or more work assemblies configured to process the received crop;
at least one NIR sensor positioned to detect at least one aspect regarding at least a part of the crop stream downstream from the one or more work assemblies and generate one or more signals indicative of the at least a part of the crop stream downstream from the one or more work assemblies; and
an evaluation device configured to:
receive the one or more signals indicative of at least a part of the crop stream; and
analyze the one or more signals in order to determine:
at least one aspect regarding cracking of the grain components in the crop stream; and whether at least a part of the one or more work assemblies configured to process the received crop is worn.

2. The agricultural harvesting machine of claim 1, wherein the evaluation device is configured to analyze the one or more signals in order to determine a degree to which the grain components in the crop stream are cracked; and
wherein the evaluation device is further configured to:
responsive to determining a degree of cracking of the crop stream, send a command to the one or more work assemblies, the command configured to control the one or more work assemblies in order for the one or more work assemblies to set at least one operating parameter.

3. The agricultural harvesting machine of claim 2, wherein the evaluation device is configured to send the command automatically responsive to determining the degree of cracking of the crop stream.

4. The agricultural harvesting machine of claim 2, wherein the evaluation device is configured to:
responsive to determining the degree of cracking of the crop stream, generate an output for review by an operator of the agricultural harvesting machine, the output indicative of setting the at least one operating parameter; and
responsive to generating the output and receiving confirmation from the operator, send the command to the one or more work assemblies in order to set the at least one operating parameter.

5. The agricultural harvesting machine of claim 2, further comprising a transfer device; and
wherein the at least one NIR sensor is positioned in the transfer device.

6. The agricultural harvesting machine of claim 1, wherein the evaluation device comprises at least one memory device in which a database is saved with reference values indicative of different degrees of cracking; and
wherein the evaluation device is configured to determine the degree to which the grain components in the crop stream are cracked by comparing the one or more signals generated by the at least one NIR sensor with the reference values in the database.

7. The agricultural harvesting machine of claim 1, wherein the evaluation device is configured to determine a degree of cracking by comparing color spectra.

8. The agricultural harvesting machine of claim 1, wherein the evaluation device is configured to analyze the one or more signals by:
accessing a correlation between at least one operating parameter of the one or more work assemblies and a categorization of default cracking degrees; and
using the accessed correlation in order to analyze the one or more signals generated by the at least one NIR sensor.

9. The agricultural harvesting machine of claim 1, wherein the one or more work assemblies comprises a secondary crushing device that comprises a plurality of rollers;
wherein the secondary crushing device is configured to receive commands to set one or more operating parameters, the one or more operating parameters comprise one or both of spacing of the plurality of rollers or a differential rotational speed of the plurality of the rollers;
wherein the evaluation device is configured to:
determine a current degree of cracking of the grain components based on the analysis of the one or more signals of the at least one NIR sensor;
access a correlation between an operating parameter of the one or more work assemblies and expected cracking degrees;
access a current operating parameter of the one or more work assemblies; and
detect wear in the secondary crushing device based the current degree of cracking, the current operating parameter, and the correlation between the operating parameter and the expected cracking degrees.

10. The agricultural harvesting machine of claim 9, wherein the evaluation device is configured to detect the wear in the secondary crushing device by:
determine current expected degree of cracking of the secondary crushing device using the current operating parameter and the correlation between the operating parameter and the expected cracking degrees;
compare the current expected degree of cracking with the current degree of cracking; and
determine that the secondary crushing device is worn responsive to determining that the current degree of cracking is less than the current expected degree of cracking.

11. A method for operating an agricultural harvesting machine comprising:

receiving, using an attachment, a crop comprising grain components, the crop traversing through the agricultural harvesting machine comprising a crop stream;

processing, using one or more work assemblies, the received crop;

generating, using at least one NIR sensor positioned to generate one or more signals indicative of at least a part of the crop stream downstream from the one or more work assemblies;

receiving, by an evaluation device, the one or more signals indicative of at least a part of the crop stream; and analyzing, by the evaluation device, the one or more signals in order to determine: at least one aspect regarding cracking of the grain components in the crop stream; and whether at least a part of the one or more work assemblies configured to process the received crop is worn.

12. The method of claim 11, wherein analyzing the one or more signals determining a degree to which the grain components in the crop stream are cracked.

13. The method of claim 12, further comprising:

responsive to determining the degree of cracking of the crop stream, sending a command to the one or more work assemblies, the command causing the one or more work assemblies to set at least one operating parameter; and wherein the evaluation device automatically sends the command responsive to determining the degree of cracking of the crop stream.

14. The method of claim 11, wherein the one or more work assemblies comprises a secondary crushing device that comprises a plurality of rollers, the secondary crushing device receiving commands to set one or more operating parameters, the one or more operating parameters comprise one or both of spacing of the plurality of rollers or a differential rotational speed of the plurality of the rollers; and further comprising:

determining a current degree of cracking of the grain components based on the analysis of the one or more signals of the at least one NIR sensor;

accessing a correlation between an operating parameter of the one or more work assemblies and expected cracking degrees;

accessing a current operating parameter of the one or more work assemblies;

determining a current expected degree of cracking of the secondary crushing device using the current operating parameter and the correlation between the operating parameter and the expected cracking degrees;

comparing the current expected degree of cracking with the current degree of cracking; and determining that the secondary crushing device is worn responsive to determining that the current degree of cracking is less than the current expected degree of cracking.

15. The agricultural harvesting machine of claim 1, wherein the one or more work assemblies comprise a crushing device with teeth; and wherein the evaluation device is configured to analyze the one or more signals in order to determine whether the teeth of the crushing device are worn.

16. The agricultural harvesting machine of claim 1, the evaluation device is configured to analyze the one or more signals in order to determine whether the one or more work assemblies are operating properly or malfunctioning by:

determining a current degree of cracking;

determining an expected degree of cracking based on a current setting of the one or more work assemblies;

comparing the current degree of cracking with the expected degree of cracking; and based on the comparison of the current degree of cracking with the expected degree of cracking, determining whether the one or more work assemblies are operating properly or malfunctioning.

17. The method of claim 11, the evaluation device analyzes the one or more signals in order to determine whether the one or more work assemblies are operating properly or malfunctioning by:

determining a current degree of cracking;

determining an expected degree of cracking based on a current setting of the one or more work assemblies;

comparing the current degree of cracking with the expected degree of cracking; and based on the comparison of the current degree of cracking with the expected degree of cracking, determining whether the one or more work assemblies are operating properly or malfunctioning.

* * * * *